United States Patent [19]

Sasaki et al.

[11] Patent Number: 5,053,745
[45] Date of Patent: Oct. 1, 1991

[54] APPARATUS FOR WARNING OF ENGINE OIL ABNORMALITY

[75] Inventors: Asao Sasaki, Chiba; Yosuke Kubota, Tokyo, both of Japan

[73] Assignee: Fuji Jukogyo Kabushiki Kaisha, Tokyo, Japan

[21] Appl. No.: 542,984

[22] Filed: Jun. 25, 1990

[30] Foreign Application Priority Data

Jun. 26, 1989 [JP] Japan .............................. 1-164828[U]
Jul. 4, 1989 [JP] Japan ................................ 1-79349[U]

[51] Int. Cl.$^5$ .............................................. B60Q 1/00
[52] U.S. Cl. .................................... 340/450.3; 340/459
[58] Field of Search ...................... 340/450.3, 450, 449, 340/459, 620; 180/271; 123/198 DC; 73/304 R, 295

[56] References Cited

U.S. PATENT DOCUMENTS

| 4,074,672 | 2/1978 | LaDue et al. ........................ 340/449 |
| 4,518,956 | 5/1985 | Kitagawa et al. ........... 340/450.3 X R |
| 4,622,935 | 11/1986 | Janisch ........................... 123/198 DC |
| 4,720,997 | 1/1988 | Doak et al. ............................ 73/295 |
| 4,845,469 | 7/1989 | Benda .............................. 340/450.3 |
| 4,933,852 | 6/1990 | Lemelson ..................... 340/438 X R |

FOREIGN PATENT DOCUMENTS

62-26379 2/1987 Japan .
62-93417 4/1987 Japan .

*Primary Examiner*—Donnie L. Crosland
*Assistant Examiner*—Brian R. Tumm
*Attorney, Agent, or Firm*—Beveridge, DeGrandi & Weilacher

[57] ABSTRACT

An apparatus is disclosed for warning of the abnormality of an engine including a magneto generating an a.c. voltage and an ignition coil which includes a first signal generation section for generating a first signal including an electric quantity corresponding to the insulation resistance of lubricating oil, a temperature detecting section for producing temperature signal, a reference signal generation section for generating a reference signal in response to the temperature signal, an oil-shortage judging section for comparing the first signal and the reference signal to determine that the engine has a shortage of oil when the first signal is larger than the reference signal and generating a shortage signal, a control section for performing a short-circuit of a primary side of the ignition coil to produce a short-circuit current in response to the shortage signal and an oil-shortage display section for displaying the warning of the shortage of oil in response to the short-circuit current.

12 Claims, 6 Drawing Sheets

APPARATUS FOR WARNING OF ENGINE OIL ABNORMALITY

BACKGROUND OF THE INVENTION

This invention relates to an apparatus for warning of the abnormality of an engine when lubricating oil becomes less than predetermined quantity.

In general, an industrial utility engine is provided with a device which always monitors the quantity of the lubricating oil and stops the engine or turns on an alarm lamp to prevent the engine from burning when the oil becomes low.

However, it is difficult to stop the engine and further turn on the alarm lamp only by a magneto which produces minute current. Furthermore, the device should be arranged for various purposes and needs of operators. For example, when the engine is installed with a generator which is mounted on a specific location, the engine should be stopped immediately after the shortage of the oil is detected.

For another example, such an engine as installed on a golf cart requires only alarming without being stopped because the cart cannot run. However, cost for production will increase if the device is rearranged according to various purposes.

Japanese Patent Laid-open Nos. 62(1987)-93417 and -26379 disclose a float switch-type sensor and a lubricating oil pressure-type sensor respectively for detecting the shortage of lubricating oil. However, the float switch-type sensor should be dipped in the oil of an oil pan. Therefore, it is difficult to keep the sensor in good condition. On the other hand, the pressure-type sensor cannot be used for a natural lubrication-type engine but only for a forced-feed lubrication-type engine.

Recently, a sensor which has two electrodes disposed in an oil pan at a threshold level representing the shortage of lubricating oil has been developed. Therefore, the value of the resistance across the electrodes becomes so large when there is the shortage of lubricating oil. However, the lubricating oil has such a characteristic that its insulative resistance is gradually lowered with increase of temperature. (This will be explained later.)

This causes misjudgment that the engine has a shortage of lubricating oil even though the lubricating oil is enough. Such misjudging also happens when the electrodes are exposed to air due to wave motion of the lubricating oil.

SUMMARY OF THE INVENTION

An object of the present invention is to avoid misjudging that an engine has a shortage of lubricating oil due to temperature variation of the oil by compensating a reference voltage to the voltage produced by the sensor provided with two electrodes in accordance with temperature.

Another object of the present invention is to provide electric circuitry used for different purposes or operations, that is, to stop an engine when the engine has a shortage of lubricating oil and to warn the operator of the shortage without stopping the engine.

Still another object of the present invention is to accurately judge the shortage of lubricating oil even though the oil in the oil pan is experiencing wave motion.

There is provided an apparatus for warning of the abnormality of an engine including a magneto generating an a.c. voltage and an ignition coil which comprises first signal generation section for generating a first signal including electric quantity corresponding to insulation resistance of lubricating oil, a temperature detecting section for detecting an ambient temperature of the engine and for producing a temperature signal, a reference signal generation section responsive to the temperature signal for generating a reference signal, an oil-shortage judging section for comparing the first signal with the reference signal to determine that the engine has a shortage of the oil when the first signal is larger than the reference signal and for generating a shortage signal, a control section responsive to the shortage signal for performing a short-circuit of the primary side of the ignition coil to generate a short-circuit current and a display section responsive to the short-circuit current for displaying the shortage of the oil.

The apparatus further comprises means for applying the shortage signal to the control section after the shortage signal is continuously generated in a specific period of time.

The apparatus still further comprises a trigger thyristor being turned on when the shortage signal and a positive component of the a.c. voltage are applied thereto and producing a reverse recovery current flowing therethrough when a negative component of the a.c. voltage is applied thereto, a capacitor being charged with the reverse recovery current and discharging the reverse recovery current while the negative component of the a.c. voltage is applied and a drive thyristor being turned on when the reverse recovery current discharged and the negative component of the a.c. voltage are applied thereto to generate the short-circuit current and a capacitor discharging the reverse recovery current with a predetermined time constant which enables the drive thyristor to turn on in the induction-discharge region or capacitance-discharge region of the a.c. voltage.

The other objects and features of the invention will become understood from the foregoing description with reference to the accompanying drawings.

DETAILED DESCRIPTION OF THE PREFERRED EMBODIMENTS

Figure 1:
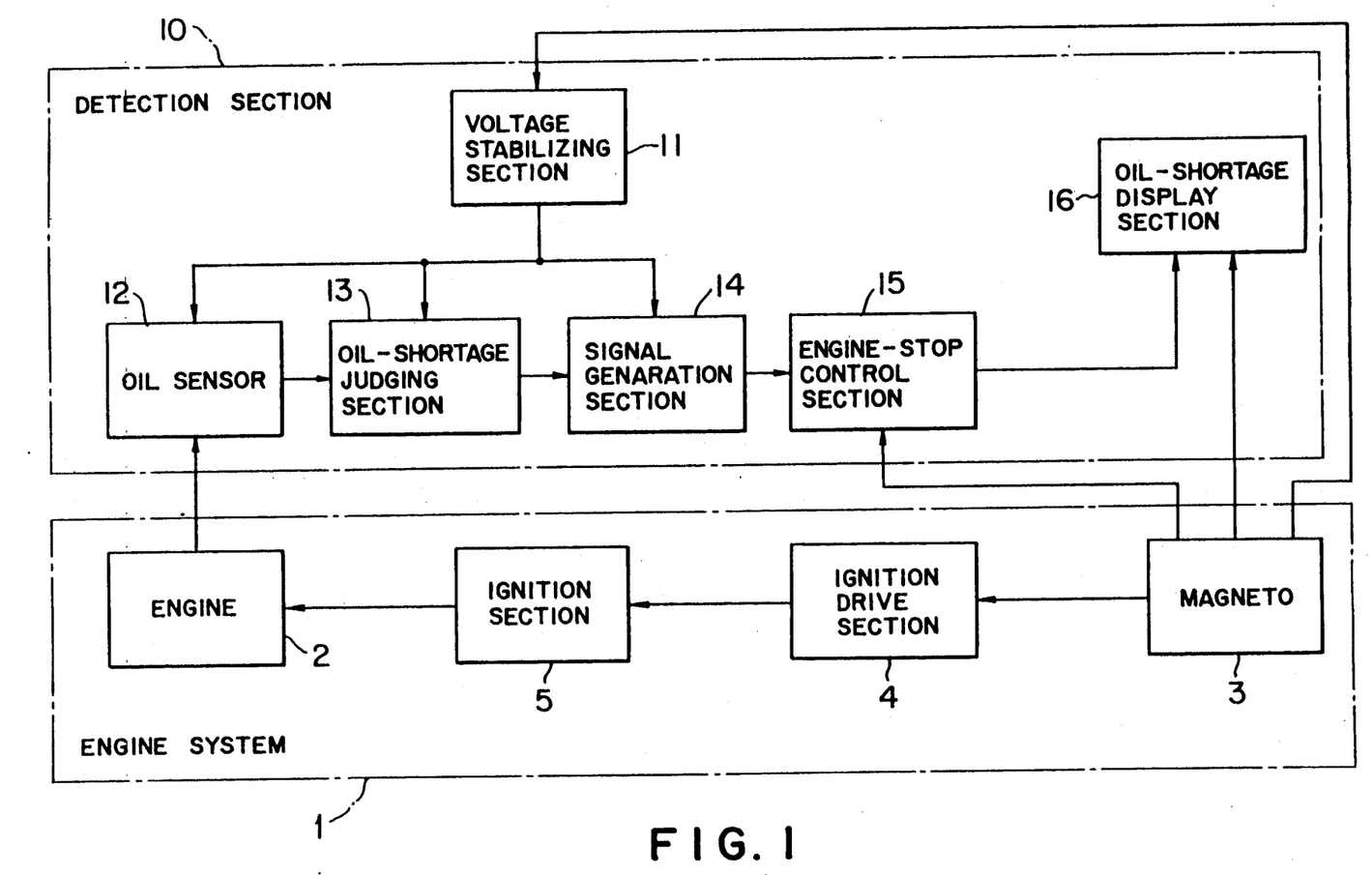
FIG. 1 is a block diagram showing a basic configuration of a preferred embodiment according to the present invention.

The preferred embodiments according to the present invention will be explained in detail with reference to the accompanying drawings. Throughout the drawings, the same reference numerals and letters are used to designate same or equivalent elements for the sake of simplicity of explanatic FIG. 1 is a block diagram showing a basic configuration of a preferred embodiment of an apparatus for warning of the abnormality of an engine according to the present invention. The apparatus is composed of an engine system 1 and an oil shortage detection section 10.

The engine system 1 comprises a magneto 3, an ignition drive section 4, an ignition section 5, and an engine 2. The detection section 10 comprises a voltage stabilizing section 11, an oil sensor 12, an oil-shortage judging section 13, a signal generation section 14, an engine-stop control section 15 and an oil-shortage display section 16.

Figure 2:
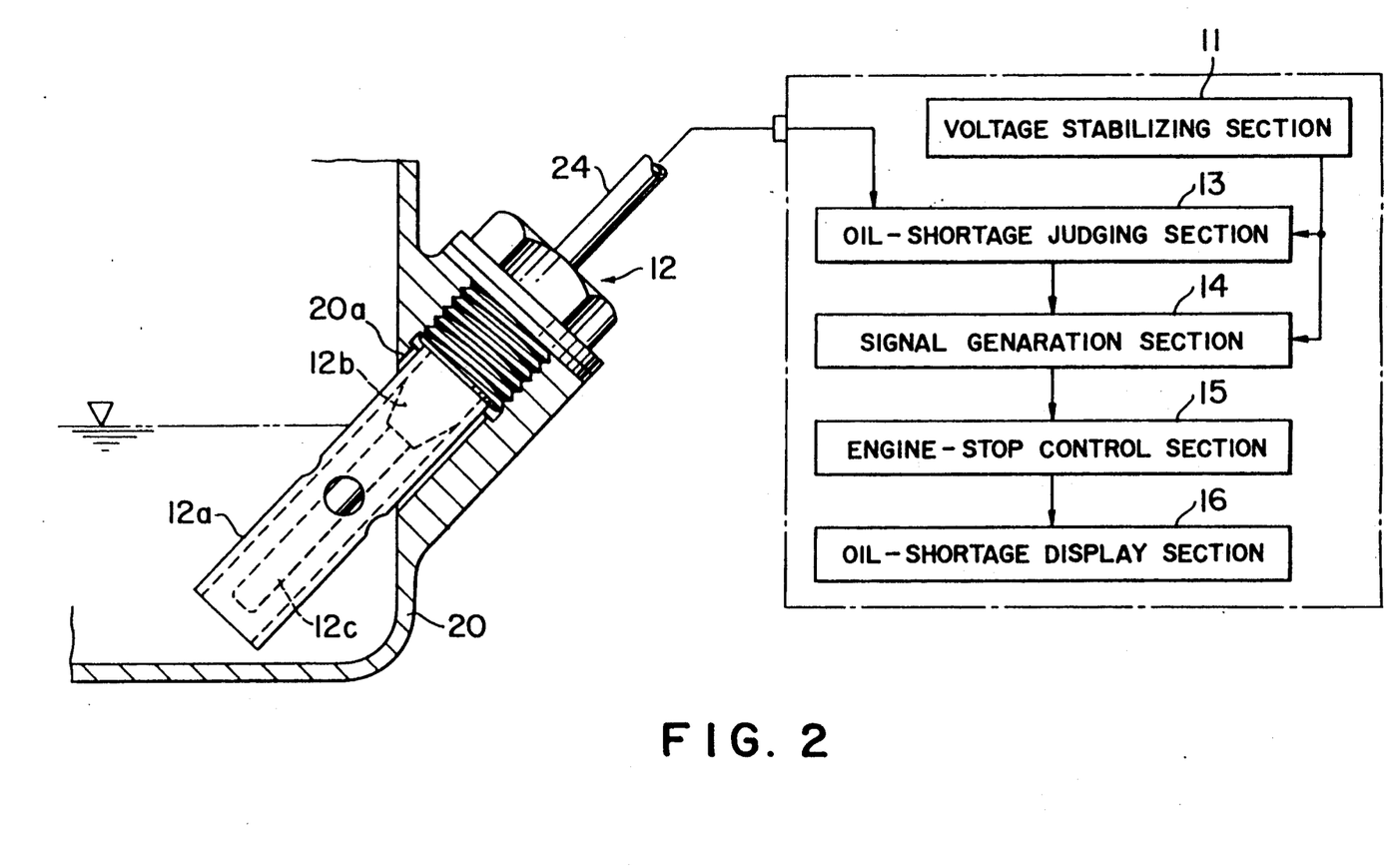
FIG. 2 is a diagrammatic view of an oil sensor disposed in an oil pan according to the present invention.
Figure 3:
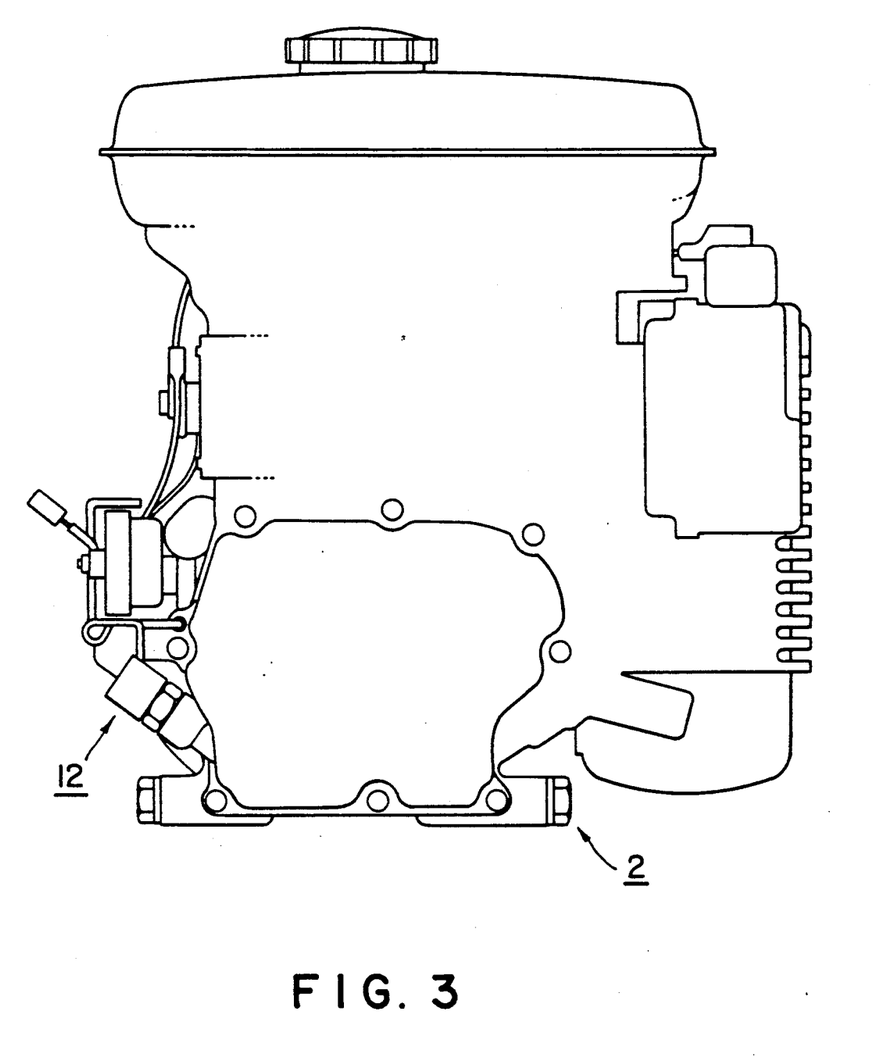
FIG. 3 is a diagrammatic view of the oil sensor attached to an engine according to the present invention.

Next as is shown in FIGS. 2 and 3 an oil sensor 12 is fixed on a boss 20a integrally formed on an oil pan 20 of the engine 2. An electrode 12a provided in the vicinity of the sensor 12 acts as a cylindrical sensor body. An electrode 12c is inserted into the center of the axis of the electrode 12a through an insulation member 12b. Both electrodes 12a and 12c are exposed into the oil pan 20 and connected to the detection section 10 through a lead wire 24.

Figure 4:
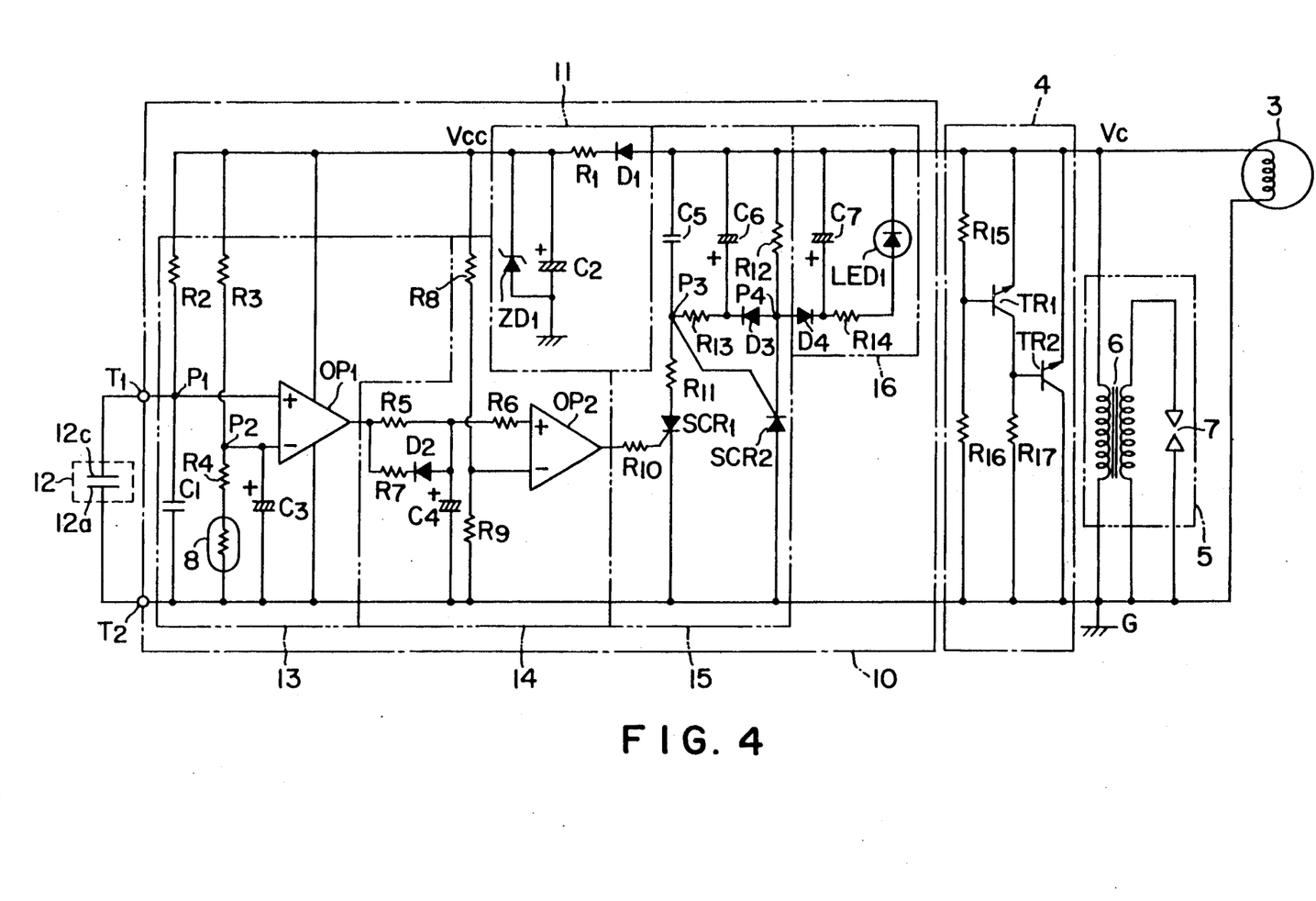
FIG. 4 shows a circuit diagram of a preferred embodiment according to the present invention.

In FIG. 4, an anode of a diode D1 provided in the voltage stabilizing section 11 is connected to the magneto 3. A cathode of the diode D1 is connected to a capacitor C1 of the judging section 13 through a resistor R1 and an extra high resistor R2. The capacitor C1 is then connected to a ground G.

In the voltage stabilizing section 11, an anode of a Zener diode ZD1 and a minus terminal of an electrolytic capacitor C2 are grounded together. A plus terminal of the capacitor and a cathode of the Zener diode ZD1 are together connected between the resistors R1 and R2.

Resistors R3 and R4 and a resistance-detection type temperature sensor 8 such as a NTC (Negative Temperature Coefficient) thermistor are connected in parallel to the resistor R2 and the capacitor C1.

A non-inverting input terminal of a comparator OP1 is connected to a point P1 between the resistor R2 and the capacitor C1, while an inverting input terminal of the comparator OP1 is connected to a point P2 between the resistors R3 and R4. A plus terminal of an electrolytic capacitor C3 whose minus terminal is connected to the ground G is connected between the inverting terminal of the comparator OP1 and the point P2.

A terminal T1 is connected to the point P1, while a terminal T2 is connected to the ground G. The electrodes 12a and 12c of the sensor 12 are connected to the terminals T1 and T2, respectively.

An electric potential Va of the point P1 under the conditions that the sensor 12 is properly connected across the terminals T1 and T2 is obtained from a following equation:

$$Va = Rdut/(Rdut+R2) \times Vcc$$

where Vcc is obtained by smoothing and stabilizing the voltage Vc applied from the magneto 3 by the voltage stabilizing section 11 and Rdut is the resistance of lubricating oil existing across the electrodes 12a and 12c of the sensor 12.

On the other hand, an electric potential Vb of the point P2, which is a reference voltage applied to the inverting input terminal of the operator OP1, is obtained from a following equation:

$$Vb = (R4+Rrtd)/(R4+Rrtd+R3) \times Vcc$$

where

Rrtd is the resistance of the temperature sensor 8.

R2, R3, R4 and Rrtd are determined so as to establish the relationship Va<Vb when the oil exists across the electrodes 12a and 12c of the sensor 12.

Figure 5:
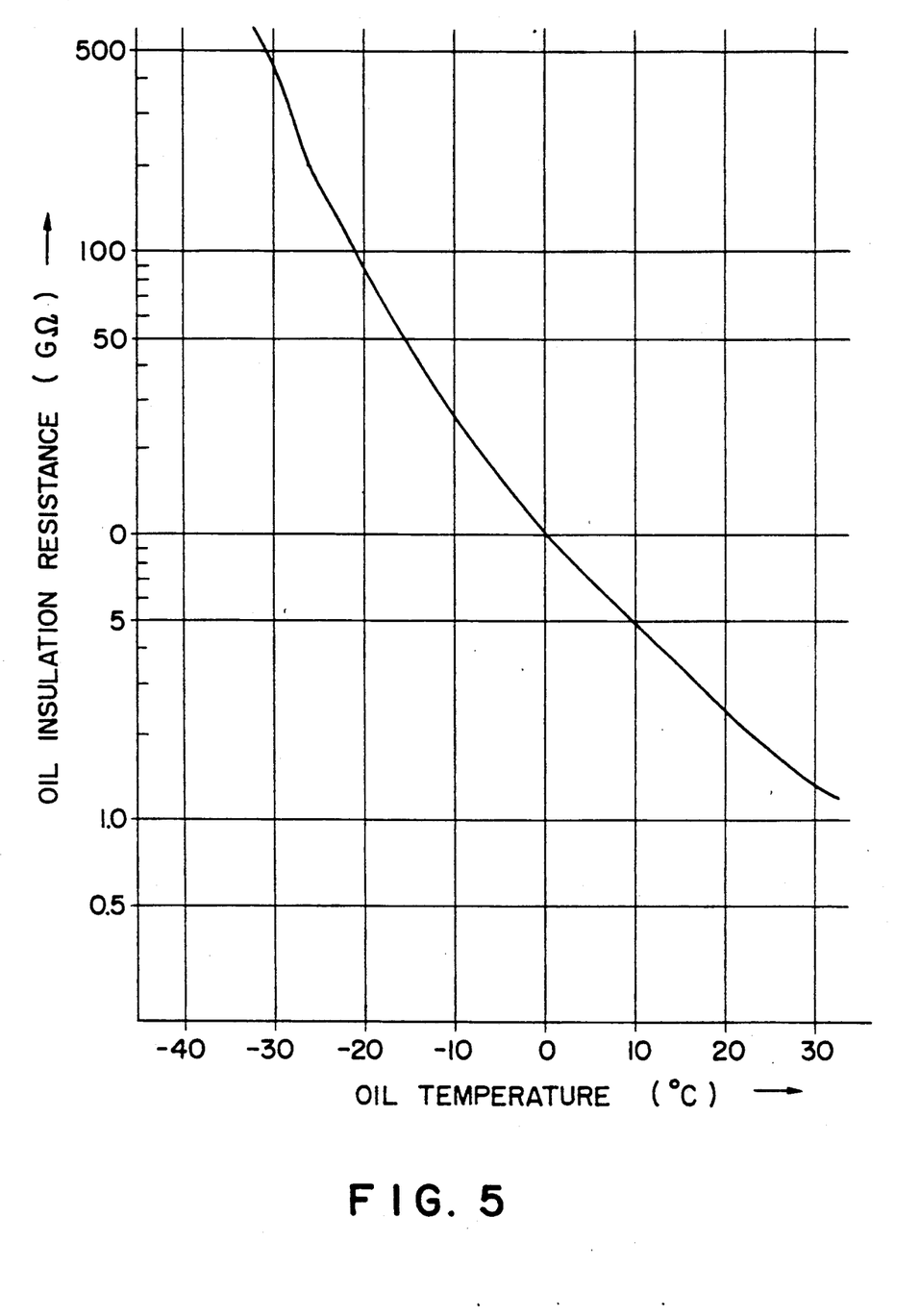
FIG. 5 shows the temperature characteristic of insulation resistance of a lubricating oil.

As is shown in FIG. 5, the insulation resistance of the oil is gradually reduced as its temperature increases. Therefore, it is necessary for the reference voltage at the point P2 to vary along the characteristic of the voltage at the point P1.

Figure 6:
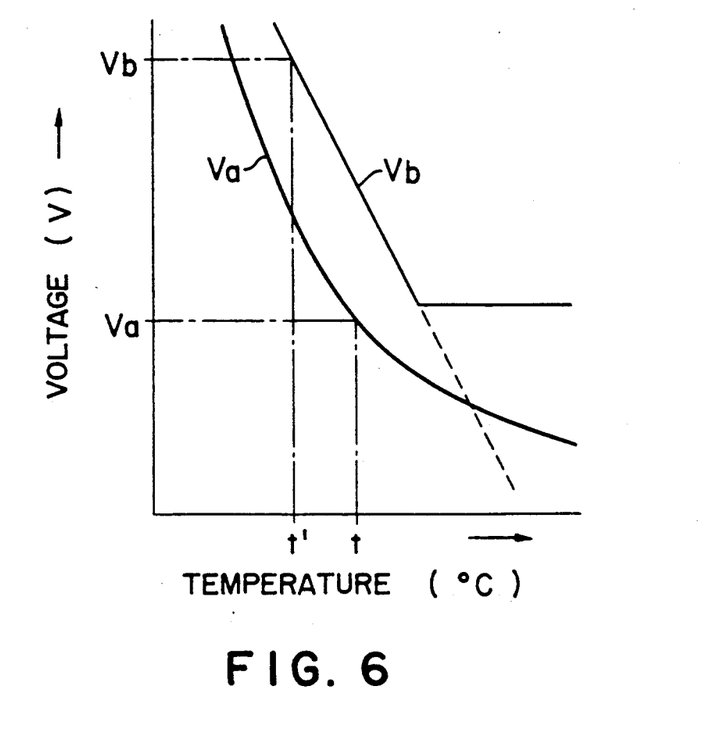
FIG. 6 shows the temperature characteristics of electric potentials Va and Vb measured at the respective points P1 and P2 in FIG. 4.

FIG. 6 shows that the temperature T of the oil with which the oil pan 20 is filled and the ambient temperature T' due to heat radiated from the engine 2 have the relationship T≧T' when the engine 2 is ordinarily operated. Therefore, the relationship Va<Vb is established.

However, the relationship between the voltages Va and Vb at the points P1 and P2 changes to Va>Vb in a high temperature condition, since the temperature sensor 8 has a proportional characteristic as shown by broken lines in FIG. 6. The resistor R4 assures the minimum value of the voltage Vb in order to avoid such situation.

The temperature sensor 8 does not directly detect the temperature T but the ambient temperature T'. However, the resistors R2, R3 and R4 may be determined so as to establish the relationship Va<Vb when the oil exists across the electrodes 12a and 12c of the sensor 12 and the temperatures T and T' are almost equal to each other before the engine 2 starts.

In the operating range where the ambient temperature T' does not increase but the temperature T increases, immediately after the engine 2 starts, the resistance of the oil is gradually reduced as the temperature T increases. Accordingly, the potential Va is further reduced. The relationship Va<Vb is thus ensured.

The relationship Va<Vb is further ensured when the ambient temperature T' gradually increases against the temperature T in ordinary operation, since the temperature T rapidly increases compared to the ambient temperature T' (T=80° C. when T'=20° C. according to an experiment).

In FIG. 4, an output terminal of the comparator OP1 is connected to another comparator OP2 through resistors R5 and R6. A plus terminal of an electrolytic capacitor C4 whose minus terminal is connected to the ground G is connected between the resistors R5 and R6. An anode of a diode D2 is connected among the resistors R5 and R6 and the plus terminal of the capacitor C4. A cathode of the diode D2 is connected between the output terminal of the comparator OP1 and the resistor R5 through a resistor R7.

The resistor R5 and the capacitor C4 constitute a charge timer which determine, the duration for the capacitor C4 to be charged, while the resistor R7 and the capacitor C4 form a discharge timer which determines the duration for the capacitor C4 to be discharged. The time constant Th of the charge timer and that Tl of the discharge timer are respectively obtained from the following equations.

$$Th = R5 \times C4$$

$$Tl = R7 \times C4$$

where Th and Tl are determined so as to establish the relationship Th>Tl.

A terminal of a resistor R8 of the signal generation section 14 is connected between the resistors R1 and R2, while the other terminal of the resistor R8 is connected to the ground G through a resistor R9. An inverting input terminal of the comparator OP2 is connected between the resistors R8 and R9. An output terminal of the comparator OP2 is connected to a gate of a thyristor SCR1 (a trigger thyristor) of the engine-stop control section 15 through a resistor R10.

A cathode of the thyristor SCR1 is connected to the ground G. An anode of the thyristor SCR1 is connected between an anode of a diode D1 of the voltage stabilizing section 11 and the magneto 3 through a resistor R11 and a capacitor C5.

A gate of another thyristor SCR2 (a drive thyristor) is connected to a point P3 between the resistor R11 and the capacitor C5. An anode of the thyristor SCR2 is connected to the ground G. A cathode of the thyristor SCR2 is connected between an anode of the diode D1 and the magneto 3 through the resistor R12.

An anode of a diode D3 is connected to a point P4 between the cathode of the thyristor SCR2 and the resistor R12. A cathode of the diode D3 is connected to the point P3 through a resistor R13.

A plus terminal of an electrolytic capacitor C6 is connected between the cathode of the diode D3 and the resistor R13. A minus terminal of the capacitor C6 is connected between the anode of the diode D1 and the magneto 3.

An anode of a diode D4 of the oil-shortage display section 16 is connected to the point P4. A plus terminal of an electrolytic capacitor C7 is connected between the cathode of the diode D4 and a resistor R14. A minus terminal of the capacitor C7 is connected between the anode of the diode D1 and the magneto 3.

An anode of a light emitting diode LED1 is connected to the resistor R14. A cathode of the LED1 is connected between the magneto 3 and the anode of the diode D1.

In the ignition section 5, a primary side of an ignition coil 6 is connected across the magneto 3 and the ground G. An ignition plug 7 is connected to a secondary side of the ignition coil 6.

Resistors R15 and R16 are connected across the magneto 3 and the ground G. A base of a NPN-type transistor Tr1 is connected between the resistors R15 and R16. A collector of the transistor Tr1 is connected to the ground G through a resistor R17. An emitter of the transistor Tr1 is connected between the magneto 3 and the primary side of the ignition coil 6.

A base of a NPN-type transistor Tr2 is connected between the collector of the transistor Tr1 and the resistor R17. A collector of the transistor Tr2 is connected between the primary side of the ignition coil 6 and the ground G. An emitter of the transistor Tr2 is connected between the magneto 3 and the primary side of the ignition coil 6.

When the engine 2 is ordinarily operated, the magneto 3 generates an alternating voltage Vc synchronized with an engine speed. The voltage Vc is then applied to the voltage stabilizing section 11 where the voltage Vc is rectified by the diode D1, smoothed by the capacitor C2 and stabilized by the Zener diode ZD1 to be applied to the oil-shortage judging section 13.

When the oil pan 20 is filled with the oil, the resistance Rdut thereof is detected across the electrodes 12a and 12c of the sensor 12, both being exposed into the oil pan 20. The voltage Va obtained from the following equation is applied to the non-inverting input terminal of the comparator OP1.

$$Va = Rdut/(Rdut + R2) \times Vcc$$

The capacitor C1 removes noises included in the voltage Va.

The reference voltage Vb obtained from the following equation is applied to the inverting input terminal of the comparator OP1.

$$Vb = (R4 + Rrtd)/(R3 + R4 + Rrtd) \times Vcc$$

The capacitor C3 smooths the reference voltage Vb and the resistor R4 assures the minimum value of the reference voltage Vb.

As is already described, the resistors R3 and R4 are adjusted so as to establish the relationship Va<Vb while the resistance of the oil is detected by the sensor 12. The comparator OP1 thus generates a signal "L" then the comparator OP2 generates a signal "L". The gate of the thyristor SCR1 is thus still in OFF-state. The oil shortage display section 16 is therefore not operated.

The sensor 12 detects air insulation resistance by means of the electrodes 12a and 12c when the oil is consumed and the electrodes 12a and 12c are exposed to air.

The air insulation resistance is extremely larger than the resistance of the oil. The voltage Va which is almost equal to the voltage Vcc is thus applied to the non-inverting input terminal of the comparator OP1. This results in the relationship Va>Vb. The comparator OP1 then generates a signal "H".

The voltage Vd applied to the non-inverting input terminal of the comparator OP2 then gradually increases with the time constant Th determined by the resistor R5 and the capacitor C4.

The comparator OP2 generates a signal "H" (a shortage signal) to turn on the thyristor SCR1 when the voltage Vd becomes higher than the reference voltage Ve applied to the inverting input terminal of the comparator OP2, which is obtained from the following equation $$Ve = R9/(R8 + R9) \times Vcc$$

The comparator OP1 generates the signal "H" even if the sensor 12 instantaneously detects the air insulation resistance when the oil waves. However, the comparator OP2 does not erroneously generate the signal "H" if the duration of the signal "H" of the comparator OP1 is shorter than the time constant Th of the charge timer.

Furthermore, even if the duration of the signal "H" due to the waves of the oil is longer than the time constant Th, when the comparator OP1 generates the signal "L", electric charges charged in the capacitor C4 are immediately discharged through the diode D2 at the time constant T1 (T1<Th) of the discharge timer composed of the capacitor C4 and the resistor R7. Therefore, the engine 2 does not erroneously stop becaue the comparator OP2 turns the output signal to "L".

The discharge timer also prevents the capacitor C4 from charging due to high impedance of the resistance detected between the electrodes 12a and 12c of the sensor 12.

When the thyristor SCR1 is turned on, a forward current flows therethrough through the resistor R12, the diode D3, the resistors R13 and R11 if the voltage Vc is higher than the ground level G, whereas, a backward current (a reverse recovery current) flows therethrough to charge the capacitors C5 and C6 if the voltage Vc is lower than the ground level G.

The thyristor SCR2 is then turned on when a discharged voltage from the capacitor C6 reaches a turn-on voltage of the gate of the thyristor SCR2. The voltage applied across the primary side of the ignition coil 6 is short-circuited to be the level below the ignition threshold level so as to extinguish the ignition plug 7.

The thyristor SCR2 thus turned on applies a charge current (short-circuit current) to the capacitor C6 to be charged. As a result, the thyristor SCR2 remains ON-state due to a discharge current from the capacitor C6 without respect to ON/OFF-state of the thyristor SCR1. The voltage applied to the primary side of the ignition coil 6 is kept below the ignition threshold level until the engine 2 stops.

Furthermore, the short-circuit current flowing through the thyristor SCR2 charges the capacitor C7 of the oil shortage display section 16 and turns on the light emitting diode LED1 to warn an operator of the cause of engine-stop.

As is already described, the voltage Vc is generated from the magneto 3 synchronized with the engine speed while the engine 2 is operated to apply a primary current to the ignition coil 6.

When the voltage Vc becomes negative, a base voltage is applied to the base of the transistor TR1 through the resistors R15 and R16. The base voltage reaches the level for turning on the transistor TR1 at a specific timing such as BTDC (Before Top Dead Center) 20°. The transistor TR1 is then turned on and the power transistor TR2 is also turned on simultaneously to short-circuit the primary side of the ignition coil 6 at a peak of the voltage Vc in a capacitance-discharge region TIGC as shown in FIG. 7.

Figure 7:
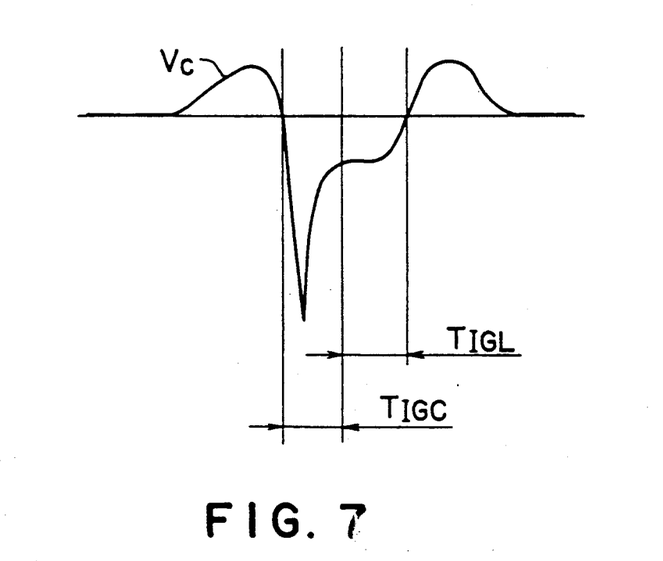
FIG. 7 shows a waveform of an ignition voltage.

The voltage as shown in FIG. 7 is thus generated across the primary side of the ignition coil 6 due to self induction. Consequently, the ignition plug 7 sparks when a voltage induced to the secondary side of the ignition coil 6 is discharged.

As is already described, when the oil is consumed and the electrodes 12a and 12c are exposed to air, the thyristor SCR2 is turned on before the peak of the voltage applied across the primary side of the ignition coil 6 to make the voltage below the ignition threshold level to stop the engine 2.

On the other hand, in the case where a warning device without stopping the engine is preferred, a discharge-time constant determined by the resistor R13 and the capacitor C5 is arranged as a large value to turn on the thyristor SCR2 after the peak of the voltage Vc, as shown in FIG. 7. Specifically, it is available to turn on the thyristor SCR2 in an induction-discharge region TIGL.

Namely, the short-circuit current due to turning on the thyristor SCR2 is applied to the light emitting diode LED1 after arc discharge of the ignition plug 7 is completed in the capacitance-discharge region TIGC and it starts glow discharge in the induction-discharge region TIGL. The light emitting diode LED1 is thus turned on when ignition of the ignition plug 7 is completed.

The short-circuit current thus flows the light emitting diode LED1 to be turned on through the thyristor SCR2, the diode D4 and the resistor R14, and also the capacitors C6 and C7 are charged.

Ignition is usually performed at a fixed-ignition timing such as BTDC 20° in an industrial engine. It is found that emitting the diode LED1 does not influence to performance of the ignition in a spark-advance region until BTDC 20° and to performance of the engine according to an experiment.

When the thyristor SCR2 is turned off, the discharge current flows from the capacitor C6 through the resistor R13 to charge the capacitor C5 with the time constant determined by R13×C5.

Accordingly, the thyristor SCR2 becomes independent of ON/OFF-state of the thyristor SCR1, once turned on. Thus, the thyristor SCR2 is again turned on by the capacitors C5 and C6 with the time constant determined by R13×C5 to continuously turn on the light emitting diode LED1 without degradation of the ignition performance.

Therefore, the light emitting diode LED1 can be turned on without stopping the engine 2 to warn the shortage of the oil by adjusting the time constant determined by R13×C5 so as to turn on the thyristor SCR2 after arc discharge of the ignition plug 7 is completed and it starts glow discharge.

As is described from the foregoing, the oil sensor is provided with the two electrodes which are disposed in the oil pan and one of the electrodes and the resistance-detection type temperature sensor such as a NTC thermistor are connected to input terminals of the comparator, respectively.

Therefore, the oil sensor is easily attached to the oil pan without installing electric circuits therein. Overall structure of the oil sensor is thus simplified and sealability is improved to accurately detect the shortage of the oil. Oil-shortage detection level is freely adjusted by varying the reference voltage to the comparator.

The apparatus according to the present invention can be applied not only to a forced-feed lubrication-type engine but also to a natural lubrication-type engine.

The shortage of the oil can be further accurately detected in entire operation region since the resistance-detection type temperature sensor compensates variation of the insulation resistance of the oil due to temperature variation.

Furthermore, the apparatus according to the present invention warns of the shortage of the oil without stopping the engine by short-circuiting the primary side of the ignition coil after the engine is ignited. Operability of the engine to which the apparatus according to the present invention is attached is thus improved.

While, the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An apparatus for warning of the abnormality of an engine including a magneto generating an a.c. voltage and an ignition coil comprising:
   first signal generation means for generating a first signal including electric quantity corresponding to insulation resistance of lubricating oil;
   temperature detecting means for detecting an ambient temperature of the engine and for producing a temperature signal;
   reference signal generation means responsive to the temperature signal for generating a reference signal;
   oil-shortage judging means for comparing the first signal with the reference signal to determine that the engine is in shortage of the oil when the first signal is larger than the reference signal and for generating a shortage signal;

control means responsive to the shortage signal for performing a short-circuit of the primary side of the ignition coil to generate a short-circuit current; and display means responsive to the short-circuit current for displaying the shortage of the oil.

2. The apparatus for warning of the abnormality of the engine according to claim 1, wherein
the first signal generation means comprising two electrodes disposed facing each other in an oil pan of the engine, which is filled with the oil and exposed to air when the amount of the oil becomes smaller than a specific amount so as to generate said first signal including electric quantity corresponding to air insulation resistance.

3. The apparatus for warning of the abnormality of the engine according to claim 1, further comprising
means for applying the shortage signal to the control means after the shortage signal is continuously generated in a specific period of time.

4. The apparatus for warning of the abnormality of the engine according to claim 1, wherein
the temperature detecting means comprises a resistor including negative temperature-characteristic.

5. The apparatus for warning of the abnormality of the engine according to claim 4, wherein
the reference signal generation means includes a plurality of resistors to define a minimum value of the reference signal when the temperature signal is small to prevent the reference signal from being less than the first signal in a normal state of the lubricating oil.

6. The apparatus for warning of the abnormality of the engine according to claim 1, wherein
the control means includes a circuit provided to short-circuit the primary side of the ignition coil in an induction-discharge region of the a.c. voltage applied to the ignition coil so as to warn of the shortage of the oil without stopping the engine.

7. The apparatus for warning of the abnormality of the engine according to claim 6 wherein the circuit comprises:
a trigger thyristor being turned on when the shortage signal and a positive component of the a.c. voltage are applied thereto and producing a reverse recovery current flowing therethrough when a negative component of the a.c. voltage is applied thereto;
a capacitor being charged with the reverse recovery current and discharging the reverse recovery current while the negative component of the a.c. voltage is applied;
a drive thyristor being turned on when the reverse recovery current is discharged and the negative component of the a.c. voltage are applied thereto to generate the short-circuit current; and
the capacitor discharging the reverse recovery current with a predetermined time constant which enables the drive thyristor to turn on in the induction-discharge region of the a.c. voltage.

8. The apparatus for warning of the abnormality of the engine according to claim 1, wherein
the control means includes a circuit provided to short-circuit the primary side of the ignition coil in a capacitance-discharge region of the a.c. voltage applied to the ignition coil so as to warn of the shortage of the oil with stopping the engine.

9. The apparatus for warning of the abnormality of the engine according to claim 8, wherein the circuit comprises:
a trigger thyristor being turned on when the shortage signal and a positive component of the a.c. voltage are applied thereto and producing a reverse recovery current flowing therethrough when a negative component of the a.c. voltage is applied thereto;
a capacitor being charged with the reverse recovery current and discharging the reverse recovery current while the negative component of the a.c. voltage is applied;
a drive thyristor being turned on when the reverse recovery current discharged and the negative component of the a.c. voltage are applied thereto to generate the short-circuit current; and
the capacitor discharging the reverse recovery current with a predetermined time constant which enables the drive thyristor to turn on in the capacitance-discharge region of the a.c. voltage.

10. A method for warning of the abnormality of an engine, comprising the steps of:
generating a first signal including electric quantity corresponding to insulation resistance of lubricating oil;
detecting an ambient temperature of the engine to provide a temperature signal;
generating a reference signal in response to the temperature signal;
comparing the first signal and the reference signal to determine that the engine is in shortage of the oil when the first signal is larger than the reference signal and to generate a shortage signal;
generating a short-circuit signal in response to the shortage signal to short-circuit the primary side of the ignition coil; and
displaying the shortage of the oil in response to the shortage signal.

11. The method for warning of the abnormality of the engine according to claim 10, wherein
the short-circuit signal is generated after the shortage signal is continuously generated for a specific period of time.

12. The method for warning of the abnormality of the engine according to claim 10, wherein
the short-circuit signal is generated after the engine is ignited and shortage of the oil is displayed without stopping the engine.

* * * * *